United States Patent [19]
Creaghe

[11] Patent Number: 5,690,141
[45] Date of Patent: Nov. 25, 1997

[54] IMPROVED VALVE COVERS

[75] Inventor: St. George Creaghe, Baton Rouge, La.

[73] Assignee: Albemarle Corporation, Richmond, Va.

[21] Appl. No.: 652,628

[22] Filed: May 17, 1996

[51] Int. Cl.$^6$ .................................................. F16K 27/08
[52] U.S. Cl. ........................ 137/382; 137/377; 137/347; 105/360
[58] Field of Search ...................................... 137/377, 382, 137/347; 105/360

[56] References Cited

U.S. PATENT DOCUMENTS

| | | | |
|---|---|---|---|
| 938,793 | 11/1909 | Schraudenbach | 137/382 |
| 2,166,730 | 7/1939 | Schanck | 137/382 |
| 3,209,675 | 10/1965 | Stimpson et al. | 105/360 |
| 3,314,444 | 4/1967 | White, Jr. | 137/377 |
| 5,251,658 | 10/1993 | Zink | 137/347 |

Primary Examiner—A. Michael Chambers
Attorney, Agent, or Firm—Philip M. Pippenger

[57] ABSTRACT

Described are improved valve covers on containers adapted for use in shipping and/or storing transportable chemicals. In one device of the invention, a hinge connects a lid to a rim and is displaced from the container's center line at a first preselected angle, is free-floating to permit horizontal self-alignment with the rim upon contact therewith, and is equipped with stop means for preventing the lid from swinging open more than a second preselected angle from a plane occupied by the sealing surface of the rim. The invention provides valve covers, and containers with valve covers, having significantly improved sealing capability to provide better protection of container valves and container content from external elements, contaminants and/or reactants, while employing a configuration which makes access to the valves and container contents easier and safer.

28 Claims, 3 Drawing Sheets

IMPROVED VALVE COVERS

TECHNICAL FIELD

This invention relates to improved valve covers on containers adapted for use in shipping and/or storing transportable chemicals.

BACKGROUND

A variety of tanks and other containers adapted for use in shipping and/or storing chemicals are well known. Most often, such containers have valves or other connections designed to facilitate loading and unloading of the chemicals. The location of these valves on a container is often a point of concern because of the vulnerability of the valves and the potential problems which can arise in the event the valves are accidentally opened or leak. Moreover, the particular chemical being stored or shipped may be of such a nature that exposure to air, water, light or other contaminants must be minimized due to their negative effects on the chemical's composition or their ability to cause an explosion or create otherwise hazardous conditions when contacting the chemical.

Because of these concerns, the valves on such containers usually have a protective cover intended to minimize the above-described risks while still permitting user access to the container valves while loading or unloading the container. Prior to the mid 1980's, known covers comprised a simple rim and lid configuration, wherein the lid was attached to the rim by a series of bolts. This cumbersome configuration was replaced in the mid 1980's by a cover comprising (i) a raised rim integral with the container and surrounding the container load valves, (ii) a circular, domed lid attached to the rim by a hinge which is parallel to an imaginary center line of the container and has and uninhibited swing, the lid also having an O-ring annularly displaced proximate to the perimeter of the lid and three bifurcated flanges evenly displaced at the lid perimeter, and (iii) three toggle bolts pivotally attached to the exterior side of the raised rim for pivotal engagement with the flanges and for securing the lid to the rim and creating a seal therebetween along the O-ring.

Unfortunately there are disadvantages to even these valve covers. The arms of the hinge between the lid and the rim are placed parallel to an imaginary center line of the container. In addition, the lid hinge is free-swinging, so that when a user accesses the valves, the lid simply falls to the side of the container surrounding the raised rim. These characteristics make accessing the valves difficult when using certain types of containers. For example, elongate cylindrical tanks used for shipping chemicals by rail, tractor trailer and/or ship have curved sides or surfaces which usually prohibit a user from freely walking around the valve cover. When straddling the imaginary center line of tanks employing the previously known valve cover, a user must push up and out, or pull up and in, to open the lid. When the lid is opened, the lid is free to fall away from the user, or toward the user, as the case may be, until the lid contacts a portion of the container surrounding the raised rim or is held in position by the user, making access to the valves much more cumbersome, hazardous and time consuming. The known cover also employs a rigid hinge joint which does not permit any alignment at the point of contact between the lid and the rim when the cover is closed. This limitation often has a negative effect on the ability of the O-ring to maintain a positive seal between the lid and the rim when the lid is in a closed position. The known cover also comprises in part a raised rim which is integral to the container itself, adding significant weight to the container and making container fabrication unnecessarily difficult.

SUMMARY OF THE INVENTION

The devices of this invention remedy the shortcomings of the known valve covers and associated containers. In particular, this invention provides for a valve cover adapted for sealably protecting valves of a storage or transportable container having an imaginary center line, the valve cover comprising (a) a lid having a perimeter, (b) a rim having a sealing surface, the rim being rigidly attached to or integral with the container and surrounding one or more valves connected to the container, (c) a hinge connecting the lid to the rim or to the container and having one or more of the following characteristics: (i) being displaced from the center line at a first preselected angle, (ii) being free-floating to permit horizontal self-alignment of the lid with the rim upon placement of the lid in contact with the sealing surface, and (iii) having stop means for preventing the lid from swinging open more than a second preselected angle from a plane occupied by the sealing surface; (d) securing means attached to the rim or to said container for securing the lid to the rim; and (e) elastomeric means disposed proximate to the perimeter for creating and maintaining a seal between the lid and the sealing surface when the lid is secured to the rim.

In preferred embodiments, the rim is raised from the surface of the container and the rim has an outer surface. Such raised rim is preferably rigidly attached at a portion of the container which has a substantially curved surface and which constitutes the highest vertical point of the container during normal use.

Also in a preferred embodiment, the lid has a plurality of bifurcated flanges extending from the perimeter, and the securing means comprises a plurality of bolts and accompanying wing nuts, each of the plurality of bolts being pivotally attached at one end to the outer surface and disposed so that each of the plurality of bolts may be pivoted to engage one of the plurality of bifurcated flanges, thereby securing the lid to said rim upon tightening of the wing nuts against the flanges.

It is preferred that the stop means comprises a stop and a flange rigidly fixed to the hinge such that, when the lid is swung upon the hinge in a direction for opening to the second preselected angle, the flange abuts the stop and thereby prevents the lid from further swing in the direction for opening. In particularly preferred embodiments, the first preselected angle is from about 40° to about 85°, and the second preselected angle is from about 105° to about 135°.

This invention also provides for a storage or transportable container having one or more valves for control of loading and/or unloading the container contents, the container being hollow and equipped with a valve cover of this invention. These and other embodiments and features of the invention will become still further apparent from the ensuing description, appended claims and accompanying drawings.

DETAILED DESCRIPTION OF THE INVENTION

It will now be seen that this invention provides, inter alia, a valve cover having significantly improved sealing capability to provide better protection of container valves and content from external elements, contaminants and/or reactants, while employing a configuration which makes access to the valves easier and safer.

Figure 1:
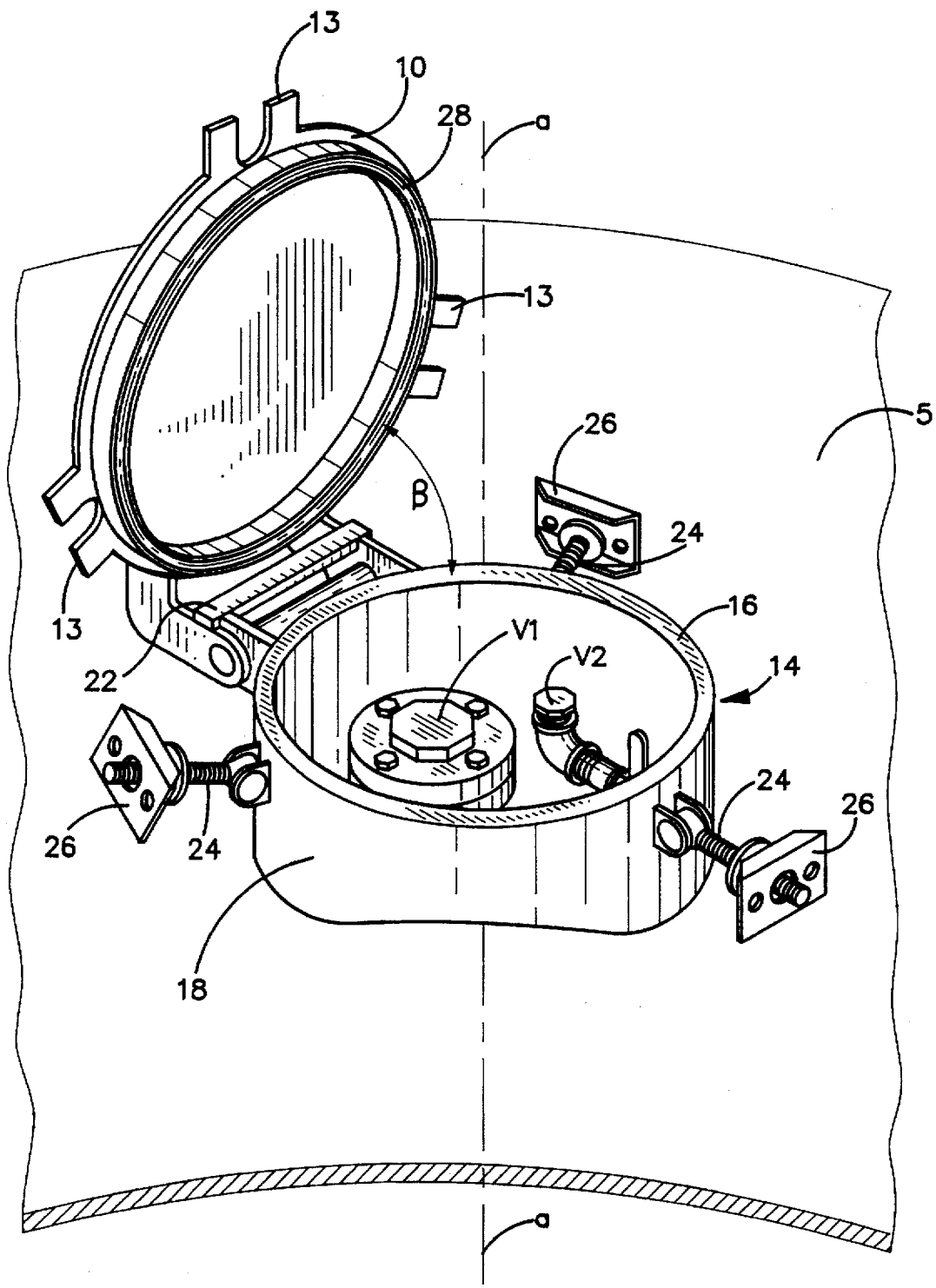
FIG. 1 is a view in perspective of a device of this invention partially broken away.

Referring to the drawings, FIG. 1 shows a valve cover of this invention having a lid 10 pivotally connected by a hinge 12 to a raised rim 14 which, in turn, is rigidly attached to a container 5 and surrounds two valves V1 and V2 which control the flow of material or chemicals into and out of container 5. Rim 14 has a sealing surface 16 and an outer surface 18. Container 5 has an imaginary center line a, and lid 10 has a perimeter 11 from which a plurality of bifurcated flanges 13 extend. Hinge 12 (i.e., an imaginary line extending from the center of hinge 12 and perpendicular to the rotational axis of hinge 12) is displaced from center line a at a first preselected angle α, and is free-floating to permit horizontal self-alignment of lid 10 with rim 14 upon placement of lid 10 in contact with sealing surface 16. By "free-floating" it is meant that while hinge 12 connects lid 10 to rim 14, the connection is sufficiently loose so as to permit lid 10 to settle into a position of substantial, sealable contact with rim 14 when lowered thereon. Hinge 12 has stop means in the form of a stop 20 and a flange 22 rigidly fixed to hinge 12 which, upon abutting stop 20, prevents lid 10 from swinging open about hinge 12 more than a second preselected angle β from a plane occupied by sealing surface 16. Means for securing lid 10 to rim 14 are provided by a plurality of bolts 24 and accompanying wing nuts 26, each of bolts 24 being pivotally attached at one end to outer surface 18 and disposed so that each of bolts 24 may be pivoted to engage one of the bifurcated flanges 13, thereby securing lid 10 to rim 14 upon the tightening of wing nuts 26 onto bolts 24 and against bifurcated flanges 13. Elastomeric means in the form of an O-ring 28 is disposed proximate to perimeter 11 for creating and maintaining a seal between lid 10 and sealing surface 16 when lid 10 is secured to rim 14. The elastomeric means employed in the device may be O-rings or other suitable elastomeric materials which can provide a seal. However, conventional O-rings fabricated with standard rubber compositions are preferred.

In preferred embodiments, rim 14 is rigidly attached at a portion of container 5 which has a substantially curved surface and which constitutes the highest vertical point of the container during normal use. While other angles may be used as appropriate under the circumstances, first preselected angle α is preferably from about 40° to about 85° (most preferably about 45°), and second preselected angle β is from about 105° to about 135° (most preferably about 110°).

Figure 2:
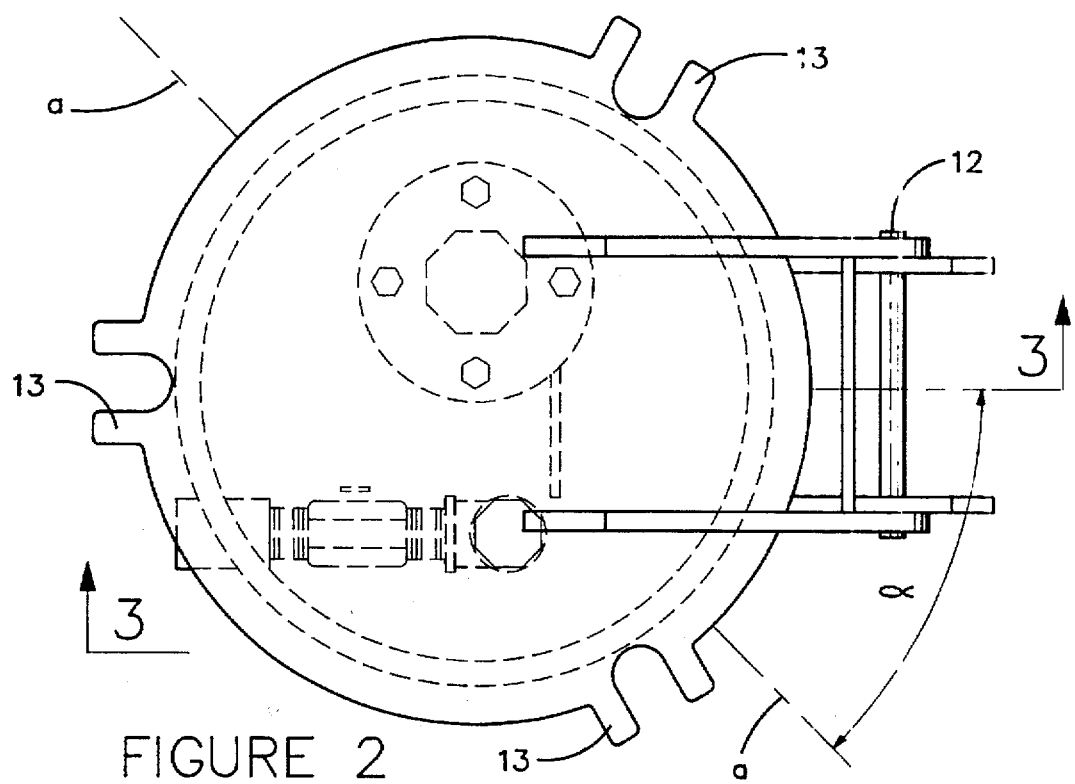
FIG. 2 is a top, phantom plan view of a portion of the device of FIG. 1.
Figure 3:
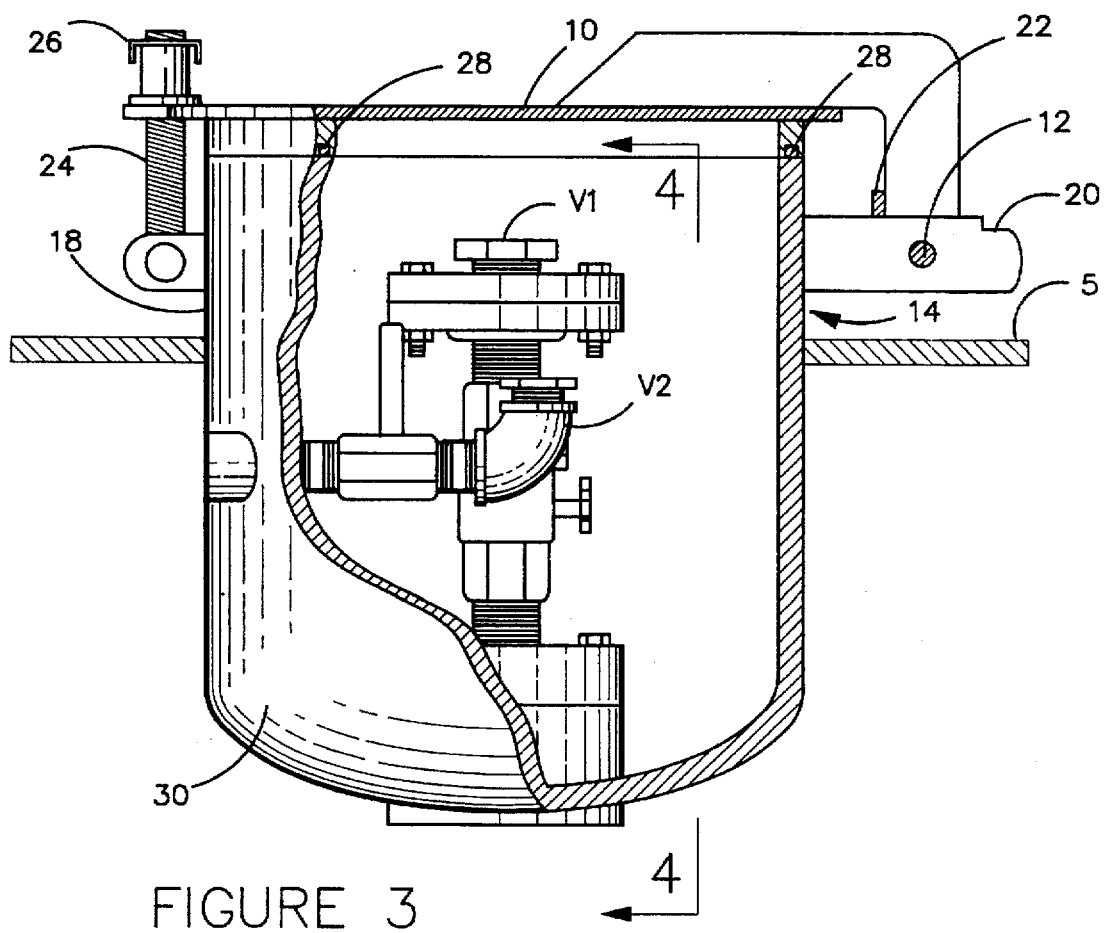
FIG. 3 is a side plan view of the device of FIG. 2 in partial cross-section and partially broken away.
Figure 4:
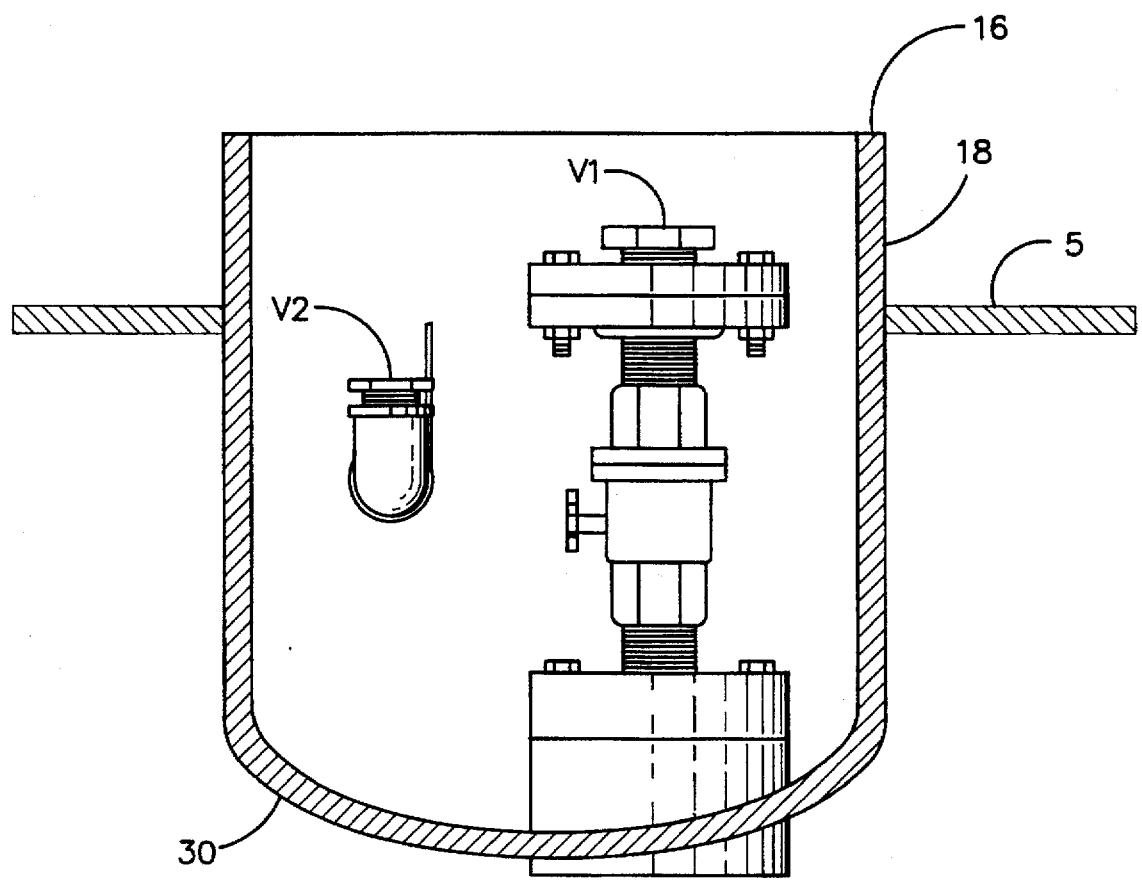
FIG. 4 is a cross-section side view of a portion of the device of FIG. 3.

FIG. 2 illustrates a view from above a valve cover of this invention showing the spacial relationship between the plurality of bifurcated flanges 13 about lid 10 and hinge 12. FIG. 2 also illustrates the first preselected angle (α) at which hinge 12 is displaced from center line a. FIG. 3 shows a side view of the embodiment of FIG. 2 partially broken away along lines 3,3 to reveal valves V1 and V2. Lid 10 and bolts 24 (only one depicted) are in a closed position. It will be noted that in this embodiment rim 14 is part of a bowl 30 which extends through container 5 to house valves V1 and V2. While there is no requirement that rim 14 be a part of bowl 30, such a configuration is preferred because it facilitates manufacture and installation of the device, since bowl 30 can be preassembled and then placed through an aperture in the container wall and welded or otherwise rigidly attached thereto. This bowl component made be fabricated of material similar to the material of container 5, or of lighter weight material for ease in manufacture, so long as the integrity of the container is not compromised. It is also preferred, but not required, that the container to which the raised rim is attached have a substantially curved surface which constitutes the highest vertical point of the container during normal use, for it is under such circumstances that the preferred embodiments of this invention are put to particularly beneficial use. The containers of this invention are hollow when empty and may include, for example, railroad tank car containers, transportable storage tanks for ocean-going vessels, trailer-type containers towable by tractors or other vehicles, stationary storage tanks, and the like. FIG. 4 illustrates a cross-sectional view of the device of FIG. 3 along line 4,4, without the lid, hinge, bolts or wing nuts.

Various stop means for preventing the lid from swinging open about the hinge more than a preselected angle from a plane occupied by the sealing surface may be employed in this invention, including ridged hinges which have limited swing and separate slides connected to the lid and rim, to name but a few. As illustrated in the drawings, most preferred is a stop and a flange rigidly fixed to the hinge of the cover which abuts the stop when the lid is opened to the preselected angle. The securing means of this invention attached to the rim for securing the lid to the rim may also be any one of a variety of things, including for example clamps, locks, screws and bolts, the preferred being a plurality of bolts and accompanying wing nuts, each of the bolts being pivotally attached at one end to the outer surface of the rim of this invention and disposed so that each of the bolts may be pivoted to engage one of the bifurcated flanges at the perimeter of the lid. The number of bifurcated flanges and corresponding bolts and wing nuts may vary, with 2 to 6 being preferred, and 3 being most preferred.

It will be understood that the device of this invention, and/or each of its individual parts, may have numerous different dimensions, depending upon the requirements of a given set of circumstances, so long as the dimensions do not substantially detract from the function and utility of the device.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law. In the claims, means-plus-function clauses are intended to cover the structures described herein as performing the cited function and not only structural equivalents but also equivalent structures.

What is claimed is:

1. A valve cover adapted for sealably protecting valves of a storage or transportable container having an imaginary center line, said cover comprising:

a) a lid having a perimeter;

b) a rim having a sealing surface, said rim being rigidly attached to or integral with said container and surrounding one or more valves connected to said container;

c) a hinge connecting said lid to said rim, said hinge being free-floating to permit horizontal self-alignment of said lid with said rim upon placement of said lid in contact with said sealing surface;

d) securing means attached to said rim or said container for securing said lid to said rim; and e) elastomeric means disposed proximate to said perimeter for creating and maintaining a seal between said lid and said sealing surface when said lid is secured to said rim.

2. A valve cover according to claim 1, wherein said rim is raised and includes an outer surface.

3. A valve cover according to claim 2 further comprising a bowl-shaped component into which said valves protrude, the upper portion of said component constituting said raised rim.

4. A valve cover according to claim 2 wherein said raised rim is rigidly attached at a portion of said container which has a substantially curved surface and which constitutes the highest vertical point of said container during normal use.

5. A valve cover according to claim 2 wherein
said lid has a plurality of bifurcated flanges extending from said perimeter, and said securing means comprises a plurality of bolts and accompanying wing nuts, each of said plurality of bolts being pivotally attached at one end to said outer surface and disposed so that each of said plurality of bolts may be pivoted to engage one of said plurality of bifurcated flanges, thereby securing said lid to said rim upon tightening of said wing nuts against said flanges; and b) said elastomeric means is at least one O-ring; and c) said raised rim is rigidly attached at a portion of said container which has a substantially curved surface and which constitutes the highest vertical point of said container during normal use.

6. A valve cover adapted for sealably protecting valves of a storage or transportable container having an imaginary center line, said cover comprising:

a) a lid having a perimeter;

b) a rim having a sealing surface, said rim being rigidly attached to or integral with said container and surrounding one or more valves connected to said container;

c) a hinge connecting said lid to said rim, said hinge (i) being displaced from said center line at a first preselected angle, and (ii) having stop means for preventing said lid from swinging open more than a second preselected angle from a plane occupied by said sealing surface;

d) securing means attached to said rim or to said container for securing said lid to said rim; and e) elastomeric means disposed proximate to said perimeter for creating and maintaining a seal between said lid and said sealing surface when said lid is secured to said rim.

7. A valve cover according to claim 6, wherein said rim is raised and includes an outer surface.

8. A valve cover according to claim 7, further comprising a bowl-shaped component into which said valves protrude, the upper portion of said component constituting said raised rim.

9. A valve cover according to claim 7 wherein said raised rim is rigidly attached at a portion of said container which has a substantially curved surface and which constitutes the highest vertical point of said container during normal use.

10. A valve cover according to claim 7, wherein
a) said lid has a plurality of bifurcated flanges extending from said perimeter, and said securing means comprises a plurality of bolts and accompanying wing nuts, each of said plurality of bolts being pivotally attached at one end to said outer surface and disposed so that each of said plurality of bolts may be pivoted to engage one of said plurality of bifurcated flanges, thereby securing said lid to said rim upon tightening of said wing nuts against said flanges;

b) said elastomeric means is at least one O-ring;

c) said stop means comprises a flange and a stop rigidly fixed to said hinge such that, when said lid is swung upon said hinge in a direction for opening to said second preselected angle, said flange abuts said stop and thereby prevents said lid from further swing in said direction for opening;

d) said first preselected angle is from about 40° to about 85°, and said second preselected angle is from about 105° to about 135°; and e) said raised rim is rigidly attached at a portion of said container which has a substantially curved surface and which constitutes the highest vertical point of said container during normal use.

11. A valve cover adapted for sealably protecting valves of a storage or transportable container having an imaginary center line, said cover comprising:

a) a lid having a perimeter;

b) a rim having a sealing surface, said rim being rigidly attached to or integral with said container and surrounding one or more valves connected to said container;

c) a hinge connecting said lid to said rim or to said container, said hinge (i) being displaced from said center line at a first preselected angle, (ii) being free-floating to permit horizontal self-alignment of said lid with said rim upon placement of said lid in contact with said sealing surface, and (iii) having stop means for preventing said lid from swinging open more than a second preselected angle from a plane occupied by said sealing surface;

d) securing means attached to said rim or to said container for securing said lid to said rim; and e) elastomeric means disposed proximate to said perimeter for creating and maintaining a seal between said lid and said sealing surface when said lid is secured to said rim.

12. A valve cover according to claim 11, wherein said rim is raised and includes an outer surface.

13. A valve cover according to claim 12, further comprising a bowl-shaped component into which said valves protrude, the upper portion of said component constituting said raised rim.

14. A valve cover according to claim 12 wherein said lid has a plurality of bifurcated flanges extending from said perimeter, and said securing means comprises a plurality of bolts and accompanying wing nuts, each of said plurality of bolts being pivotally attached at one end to said outer surface and disposed so that each of said plurality of bolts may be pivoted to engage one of said plurality of bifurcated flanges, thereby securing said lid to said rim upon tightening of said wing nuts against said flanges.

15. A valve cover according to claim 14 wherein said elastomeric means is an O-ring.

16. A valve cover according to claim 12 wherein said stop means comprises a flange and a stop rigidly fixed to said hinge such that, when said lid is swung upon said hinge in a direction for opening to said second preselected angle, said flange abuts said stop and thereby prevents said lid from further swing in said direction for opening.

17. A valve cover according to claim 12 wherein said first preselected angle is from about 40° to about 85°, and said second preselected angle is from about 105° to about 135°.

18. A valve cover according to claim 12 wherein said raised rim is rigidly attached at a portion of said container which has a substantially curved surface and which constitutes the highest vertical point of said container during normal use.

19. A valve cover according to claim 12 wherein
   a) said lid has a plurality of bifurcated flanges extending from said perimeter, and said securing means comprises a plurality of bolts and accompanying wing nuts, each of said plurality of bolts being pivotally attached at one end to said outer surface and disposed so that each of said plurality of bolts may be pivoted to engage one of said plurality of bifurcated flanges, thereby securing said lid to said rim upon tightening of said wing nuts against said flanges;
   b) said elastomeric means is at least one O-ring;
   c) said stop means comprises a flange and a stop rigidly fixed to said hinge such that, when said lid is swung upon said hinge in a direction for opening to said second preselected angle, said flange abuts said stop and thereby prevents said lid from further swing in said direction for opening;
   d) said first preselected angle is from about 40° to about 85°, and said second preselected angle is from about 105° to about 135°; and
   e) said raised rim is rigidly attached at a portion of said container which has a substantially curved surface and which constitutes the highest vertical point of said container during normal use.

20. A storage or transportable container having an imaginary center line, said container comprising:
   a) a hollow container;
   b) one or more valves connected to said container for controlling the loading and/or unloading of the contents of said container, and
   c) a valve cover further comprising:
      i) a lid having a perimeter;
      ii) a rim having a sealing surface, said rim being rigidly attached to or integral with said container and surrounding one or more of said valves;
      iii) a hinge connecting said lid to said rim or to said container, said hinge (A) being displaced from said center line at a first preselected angle, (B) being free-floating to permit horizontal self-alignment of said lid with said rim upon placement of said lid in contact with said sealing surface, and (C) having stop means for preventing said lid from swinging open more than a second preselected angle from a plane occupied by said sealing surface;
      iv) securing means attached to said rim or to said container for securing said lid to said rim; and
      v) elastomeric means disposed proximate to said perimeter for creating and maintaining a seal between said lid and said sealing surface when said lid is secured to said rim.

21. A container according to claim 20, wherein said rim is raised and includes an outer surface.

22. A container according to claim 21 further comprising a bowl-shaped component into which said valves protrude, the upper portion of said component constituting said raised rim.

23. A container according to claim 21 wherein said lid has a plurality of bifurcated flanges extending from said perimeter, and said securing means comprises a plurality of bolts and accompanying wing nuts, each of said plurality of bolts being pivotally attached at one end to said outer surface and disposed so that each of said plurality of bolts may be pivoted to engage one of said plurality of bifurcated flanges, thereby securing said lid to said rim upon tightening of said wing nuts against said flanges.

24. A container according to claim 23 wherein said elastomeric means is an O-ring.

25. A container according to claim 21 wherein said stop means comprises a flange and a stop rigidly fixed to said hinge such that, when said lid is swung upon said hinge in a direction for opening to said second preselected angle, said flange abuts said stop and thereby prevents said lid from further swing in said direction for opening.

26. A container according to claim 21 wherein said first preselected angle is from about 40° to about 85°, and said second preselected angle is from about 105° to about 135°.

27. A container according to claim 21 wherein said raised rim is rigidly attached at a portion of said container which has a substantially curved surface and which constitutes the highest vertical point of said container during normal use.

28. A container according to claim 21 wherein
   a) said lid has a plurality of bifurcated flanges extending from said perimeter, and said securing means comprises a plurality of bolts and accompanying wing nuts, each of said plurality of bolts being pivotally attached at one end to said outer surface and disposed so that each of said plurality of bolts may be pivoted to engage one of said plurality of bifurcated flanges, thereby securing said lid to said rim upon tightening of said wing nuts against said flanges;
   b) said elastomeric means is at least one O-ring;
   c) said stop means comprises a flange and a stop rigidly fixed to said hinge such that, when said lid is swung upon said hinge in a direction for opening to said second preselected angle, said flange abuts said stop and thereby prevents said lid from further swing in said direction for opening;
   d) said first preselected angle is from about 40° to about 85°, and said second preselected angle is from about 105° to about 135°; and
   e) said raised rim is rigidly attached at a portion of said container which has a substantially curved surface and which constitutes the highest vertical point of said container during normal use.

* * * * *